(12) United States Patent
Nordstrom

(10) Patent No.: US 7,169,249 B1
(45) Date of Patent: Jan. 30, 2007

(54) METHOD OF JOINING TEXTILE ELEMENTS

(75) Inventor: Matt Nordstrom, Portland, OR (US)

(73) Assignee: Nike, Inc., Beaverton, OR (US)

(*) Notice: Subject to any disclaimer, the term of this patent is extended or adjusted under 35 U.S.C. 154(b) by 308 days.

(21) Appl. No.: 10/382,798

(22) Filed: Mar. 5, 2003

(51) Int. Cl.
D04H 1/00 (2006.01)
B32B 37/02 (2006.01)

(52) U.S. Cl. .................. 156/256; 156/334; 156/514; 156/563; 428/131; 428/138; 428/200

(58) Field of Classification Search ............ 156/256, 156/513, 514, 563, 252, 253, 334; 264/152, 264/153, 155, 156, 154; 428/131, 138, 200
See application file for complete search history.

(56) References Cited

U.S. PATENT DOCUMENTS

| 1,983,323 | A | * | 12/1934 | Stokes | 493/55 |
|---|---|---|---|---|---|
| 2,125,008 | A | * | 7/1938 | Scholl | 128/894 |
| 2,729,010 | A | * | 1/1956 | George et al. | 428/43 |
| 2,798,492 | A | * | 7/1957 | Barnes et al. | 606/215 |
| 3,560,601 | A | | 2/1971 | Johnson et al. | |
| 4,562,102 | A | * | 12/1985 | Rabuse et al. | 428/43 |
| 4,971,644 | A | * | 11/1990 | Mahn et al. | 156/253 |
| 5,105,478 | A | | 4/1992 | Pyc | |
| 5,422,173 | A | * | 6/1995 | Stahl | 428/189 |
| 5,620,771 | A | | 4/1997 | Middleton | |
| 5,656,352 | A | | 8/1997 | Middleton | |
| 5,733,626 | A | | 3/1998 | Middleton | |
| 5,935,878 | A | | 8/1999 | Glasser | |
| 6,339,845 | B1 | | 1/2002 | Burns et al. | |
| 6,444,078 | B1 | * | 9/2002 | Yoo | 156/256 |
| 2005/0167045 | A1 | * | 8/2005 | Lassen et al. | 156/303.1 |

FOREIGN PATENT DOCUMENTS

| GB | 2316353 | 2/1996 |
|---|---|---|
| GB | 2 312 643 | 11/1997 |
| JP | 4308277 | 10/1992 |

OTHER PUBLICATIONS

Website pages from Bemis Associates Inc. (copyrighted 1998-2002) (5 pages).
"General Guidelines for Using Heat Seal Film Adhesive in Embroidery Applications" from Bemis Associates (Revised Feb. 2000) (8 pages total).

* cited by examiner

Primary Examiner—Linda Gray
(74) Attorney, Agent, or Firm—Banner & Witcoff, Ltd.

(57) ABSTRACT

A method of joining a first textile element and a second textile element is disclosed. The method includes four general steps: First, the first textile element, the second textile element, and an adhesive element are formed. Second, a bond is formed between the first textile element and the adhesive element to define a bonded area and an unbonded area. Third, an aperture is formed in the first textile element and the adhesive element by removing at least a portion of the bonded area. Fourth, a bond is formed between the second textile element and the bonded area, thereby joining the first textile element and the second textile element.

29 Claims, 4 Drawing Sheets

METHOD OF JOINING TEXTILE ELEMENTS

BACKGROUND OF THE INVENTION

1. Field of the Invention

The present invention relates to a method for joining textile elements. The invention concerns, more particularly, a method of utilizing a polymer adhesive to join textile elements in applications such as apparel.

2. Description of Background Art

Textiles may be defined as any manufacture from fibers, filaments, or yarns characterized by flexibility, fineness, and a high ratio of length to thickness. Textiles generally fall into two categories. The first category includes textiles produced directly from webs of fibers by bonding, fusing, or interlocking to construct non-woven fabrics and felts. The second category includes textiles formed through a mechanical manipulation of yarn, thereby producing a woven fabric.

Yarn is the raw material utilized to form textiles in the second category. In general, yarn is defined as an assembly having a substantial length and relatively small cross-section that is formed of at least one filament or a plurality of fibers. Fibers have a relatively short length and require spinning or twisting processes to produce a yarn of suitable length for use in textiles. Common examples of fibers include cotton and wool. Filaments, however, have an indefinite length and may merely be combined with other filaments to produce a yarn suitable for use in textiles. Modern filaments include a plurality of synthetic materials such as rayon, nylon, polyester, and polyacrylic, with silk being the primary, naturally-occurring exception. Yarn may be formed of a single filament (conventionally referred to as a monofilament yarn) or a plurality of individual filaments. Yarn may also be formed of separate filaments formed of different materials, or the yarn may be formed of filaments that are each formed of two or more different materials. Similar concepts also apply to yarns formed from fibers. Accordingly, yarns may have a variety of configurations that generally conform to the definition provided above.

Separate textile elements, whether classified within the first or second category, are often joined to produce a variety of consumer articles, including apparel, for example. Conventionally, the textile elements are joined through stitching, which is the interweaving of a yarn through two or more textile elements to secure the textile elements together. Although stitching may be accomplished by hand, which is recognized as a labor-intensive and inefficient process, sewing machines are generally utilized to stitch the textile elements together, thereby forming a seam between the textile elements.

Stitching is the most prevalent method of joining textile elements in modern industry. The process of stitching and the resulting stitched area, however, are subject to certain limitations. For example, sewing machines are generally configured to form a linear or gradually curving seam, rather than highly-curved or angular seams, thereby limiting the configuration of the resulting product. In addition, the edges of the textile elements may unravel if not properly surged, hemmed, or turned during the stitching process, which adds technical difficulty to the stitching process and may result in defective articles if not properly executed. Furthermore, many seams may include three or more layers of textile, due to hemming or turning of the textile elements, which increase the thickness of the seam and may represent areas of discomfort in the article.

As an alternative to stitching the edges of textile elements together, Bemis Associates, Inc. of Shirley, Mass., United States manufactures polymer heat seal seam tapes that may be utilized to reinforce seams, replace stitching, bond labels and embroidery to garments, and prevent fraying, for example. The seam tapes are thermoplastic polymers that may be applied by commercially-available taping machines and join textile elements formed of a variety of materials, including polyester, cotton, and blended fabrics that include both polyester and cotton fibers, for example.

SUMMARY OF THE INVENTION

The invention is a method of joining a first textile element and a second textile element. As an initial step in the method, the first textile element, the second textile element, and an adhesive element are provided. A first bond is then formed between the first textile element and the adhesive element to define a bonded area and an unbonded area. An aperture is then defined in the first textile element and the adhesive element by removing at least a portion of the bonded area. Finally, a second bond is formed between the second textile element and the bonded area, thereby joining the first textile element and the second textile element.

The first textile element is generally larger than the second textile element and the adhesive element. In one configuration, the second textile element and the adhesive element are formed to have substantially similar dimensions. The relative sizes of the various elements leads to a structure wherein the adhesive element and second textile element are located in a spaced relationship with edges of the first textile element. Accordingly, the position of the second textile element is generally within an interior portion of the first textile element, rather than on an edge of the first textile element. In other configurations, however, the second textile element and the adhesive element may have different dimensions, and the second adhesive element may be located on an edge of the first textile element.

The primary purpose of the adhesive element is to form a bond with the textile elements, thereby joining the first textile element and the second textile element. By configuring the second textile element and the adhesive element to have similar dimensions, and by defining the aperture within the bonded area, the adhesive element is shaped and sized to contact at least the perimeter of the second textile element to form the second bond.

The bonds between the adhesive element and the textile elements are generally formed through heat and pressure, but may also be formed through radio frequency or ultrasonic bonding processes. The amount of heat and pressure applied to form the bonds depends upon the specific material utilized for the adhesive element, which may be a thermoplastic polymer, such as polyurethane, polyamide, polyester, polyolefin, and vinyl. In general, the heat and pressure induces the adhesive element to infiltrate the structure of the textile elements. Upon subsequent cooling, the adhesive element becomes securely bonded to the textile elements.

The advantages and features of novelty characterizing the present invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary of the Invention, as well as the following Detailed Description of the Invention, will be better understood when read in conjunction with the accompanying drawings.

DETAILED DESCRIPTION OF THE INVENTION

Introduction

The following discussion and accompanying figures disclose a method of joining a first textile element and a second textile element in accordance with the present invention. The method may be incorporated into the manufacturing of a plurality of products to provide joined textile elements. Prior to discussing the method, however, the structure of an article 10 and another article 10a, which are both formed in accordance with the method, is disclosed to provide a greater understanding of the various elements and the configuration of the elements that are utilized in the method. Following the discussion of the method with respect to article 10, a pair of articles 10b and 10c are disclosed to demonstrate variations upon the specific method utilized to for article 10.

Article 10 is depicted in FIGS. 1–4 as a generally layered structure that includes a first textile element 20, a second textile element 30, and an adhesive element 40. First textile element 20 includes an outer edge 21, an inner edge 22, and an aperture 23. Outer edge 21 defines a periphery of first textile element 20 and is depicted in FIGS. 1–4 with a rectangular shape. A component having the general structure of article 10 may be incorporated into a plurality of products. Accordingly, the specific shape of first element 20, and outer edge 21 in particular, may vary significantly depending upon the particular application intended for article 10. Inner edge 22 defines aperture 23 and is positioned in a spaced relationship with outer edge 21, thereby locating aperture 23 in an interior portion of first textile element 20. Inner edge 22 and aperture 23 are depicted in FIGS. 1–4 as having an ovate shape. As with outer edge 21, however, the shape of inner edge 22 and aperture 23 may vary significantly depending upon the particular application intended for article 10.

Second textile element 30 includes an outer edge 31 that defines a periphery of second textile element 30. The configuration of second textile element 30, and outer edge 31 in particular, is proportional to aperture 23, but the dimensions of second textile element 30 are greater than the dimensions of aperture 23. Accordingly, the shape of second textile element 30 is similar to the shape of aperture 23, but larger than aperture 23. Second textile element 30 extends over adhesive element 40 and aperture 23, thereby covering aperture 23 and forming a different area of article 10 that is adjacent to aperture 23.

Figure 1:
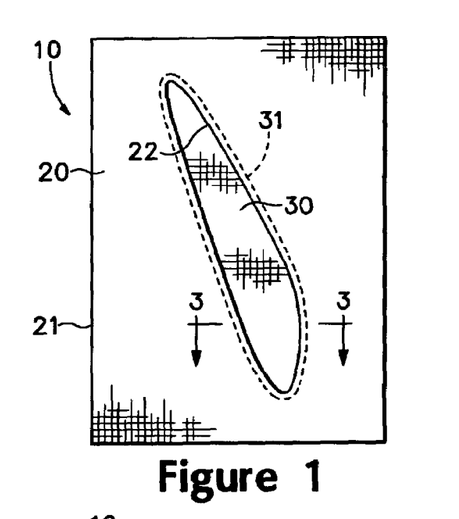
FIG. 1 is a plan view depicting a first surface of an article formed in accordance with a method of the present invention.
Figure 2:
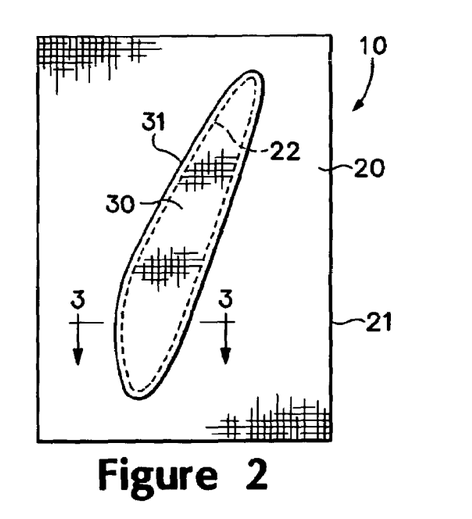
FIG. 2 is a plan view depicting a second surface of the article.
Figure 3:
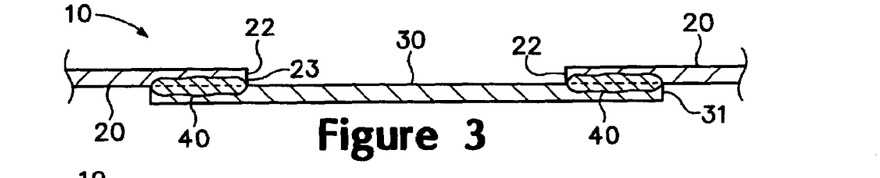
FIG. 3 is a cross-sectional view, as defined by lines 3—3 in FIGS. 1 and 2.
Figure 4:
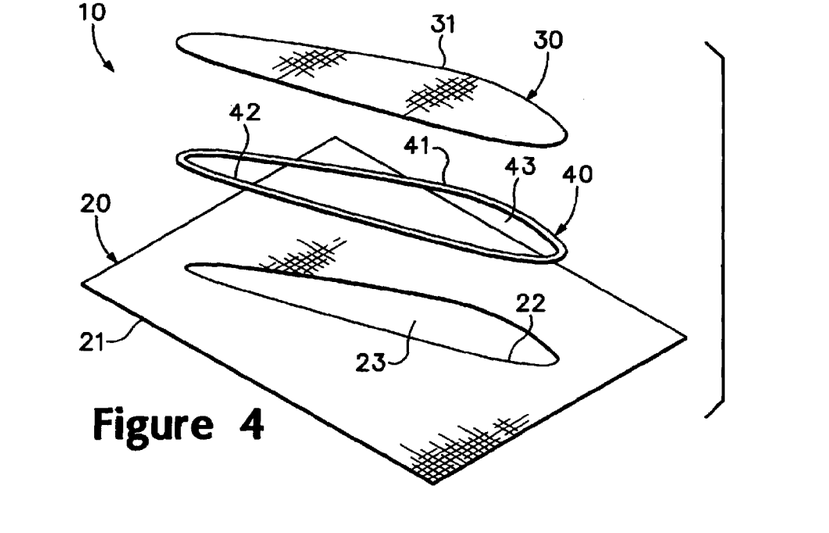
FIG. 4 is an exploded perspective view of the article.

Adhesive element 40 is positioned between elements 20 and 30 and forms a bond with each of elements 20 and 30 to effectively join elements 20 and 30. Adhesive element 40 includes an outer edge 41, an aperture edge 42, and an aperture 43. Outer edge 41 coincides with outer edge 31 of second textile element 30, and aperture edge 42 coincides with aperture edge 22 of first textile element 20. Accordingly, adhesive element 40 is positioned at the interface of elements 20 and 30, and adhesive element 40 is positioned entirely between elements 20 and 30. Furthermore, aperture 43 coincides with aperture 23, as depicted in FIG. 3, to form an opening that extends through both first textile element 20 and adhesive element 40.

As will become apparent in the discussion of the method, outer edge 31 and outer edge 41 may be formed simultaneously or separately through a die cutting operation, for example, so as to provide an equally proportioned and equally dimensioned shape to both second textile element 30 and adhesive element 40. Similarly, aperture edge 22 and aperture edge 42 may be formed simultaneously to form apertures 21 and 43 with equal proportions and dimensions.

First textile element 20 and second textile element 30 may be any manufacture from fibers, filaments, or yarns, whether natural or synthetic. Suitable textile materials for first textile element 20 and second textile element 30 are polyester, cotton, or blended fabrics that include both polyester and cotton fibers, for example. One purpose of the present method is to join textiles with different properties. Accordingly, first textile element 20 and second textile element 30 may be formed from different fibers. Alternately, first textile element 20 and second textile element 30 may display different thicknesses or degrees of abrasion resistance, different degrees of air-permeability, or different colors, for example.

Adhesive element 40 may be a thermoplastic polymer that forms bonds with first textile element 20 and second textile element 30 through the application of sufficient heat and pressure, thereby joining elements 20 and 30. Alternately, adhesive element 40 may be a material that forms the bonds through radio frequency or ultrasonic bonding processes, for example. With regard to the thermoplastic polymer, the amount of heat and pressure applied to form the bonds depends upon the specific material forming adhesive element 40, which may be polyurethane, polyamide, polyester, polyolefin, or vinyl. Suitable thermoplastic polymers formed from these materials may be supplied by Bemis Associates, Inc. of Shirley, Mass., United States. In general, the heat and pressure induces adhesive element 40 to soften or melt so as to infiltrate the structure of the textile elements. Upon subsequent cooling, adhesive element 40 becomes securely bonded to each of first textile element 20 and second textile element 30.

Article 10 has advantages over articles formed through conventional sewing techniques. As discussed above in the Background of the Invention, sewing machines are generally configured to form a linear or gradually curving seam, rather than highly-curved or angular seams, thereby limiting the configuration of the resulting product. Article 10 includes second textile element 30 which has an irregular, non-linear shape that is effectively joined with first textile element 20. As will become apparent in the following discussion, second textile element 30 may have any practical shape, whether the shape includes angles, small-radius curves, or other complex features.

With regard to the use of a conventional sewing machine, the edges of the textile elements may unravel if not properly surged, hemmed, or turned during the stitching process, which adds technical difficulty to the stitching process and may result in defective articles if not properly executed. Aperture edge 22 and outer edge 31, which generally form the edges located at the interface between first textile element 20 and second textile element 30 are not surged, hemmed, or turned to prevent unraveling or fraying. Instead, adhesive element 40 infiltrates the structures of first textile element 20 and second textile element 30 adjacent to edges 22 and 31, respectively, and binds the relative positions of the various fibers, filaments, or yarns. Accordingly, adhesive element 40 serves the dual purpose of preventing unraveling and fraying and forming bonds with first textile element 20 and second textile element 30.

Seams formed through conventional sewing techniques often include three or more layers of textile, due to hemming or turning of the textile elements, which increases the thickness of the seams and may represent areas of discomfort in the article. In contrast, article 10 has a thickness of two textile layers, first textile layer 20 and second textile layer 30, which provides a relatively thin seam. Depending upon the degree of heat and pressure applied in forming the bonds with adhesive element 40, however, adhesive layer 40 may add a negligible increase in the thickness of the interface between first textile element 20 and second textile element 30.

Figure 5:
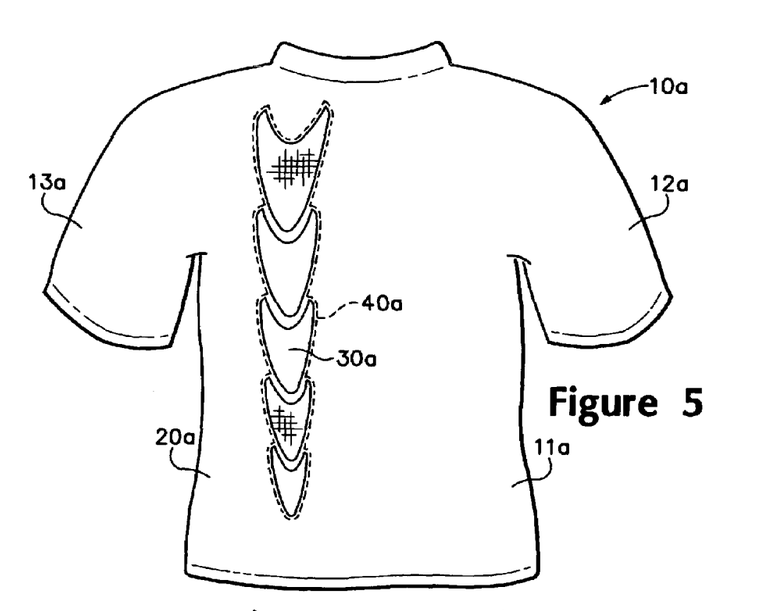
FIG. 5 is a plan view of an article of apparel formed in accordance with the method.

An article 10a is depicted in FIG. 5 in order to provide an example of an application for textiles joined through the method of the present invention. Article 10a is an article of apparel, particularly a shirt, that includes a trunk section 11a and two sleeves 12a and 13a. Trunk section 11a incorporates a component that is analogous to article 10, as described above. Accordingly, trunk section 11a includes a first textile element 20a, a second textile element 30a, and an adhesive element 40a. First textile element 20a and adhesive element 40a form a plurality of apertures, and second textile element 30a is positioned behind the apertures and joined with first textile element 20a on an interior surface of trunk section 11a. The combination of second textile element 30a and the apertures in first textile element 20a and adhesive element 40a form a design in article 10a, but may also be utilized to define numbers. Accordingly, a single aperture with a shape corresponding with the shape of a number may be defined in first textile element 20a and adhesive element 40a.

Article 10a may be utilized, for example, as a ventilated article of apparel, thereby cooling the individual. First textile element 20a may be formed of a material that wicks moisture away from the skin, thereby limiting the amount of moisture on the interior of article 10a. Second textile element 30a may be formed of a material, such as a mesh material, that provides a relatively high degree of air-permeability. During exercise, therefore, air may enter and exit the area between article 10a and the individual by passing through second textile element 30a.

Many conventional articles of apparel incorporate mesh materials to provide venting. In contrast with article 10a, the mesh material of conventional apparel is often positioned between other elements of the apparel and is joined with conventional sewn seams. Second textile element 30a, however, is positioned within interior portions of first textile element 20a and has an irregular, non-linear shape that would be difficult to efficiently reproduce with conventional sewing techniques. Furthermore, second textile element 30a forms a functional graphic, which operates to simultaneously ventilate article 10a and provide an aesthetic appearance.

Second textile element 30a is exposed by a plurality of apertures in first textile element 20a and adhesive element 40a. In manufacturing article 10a, an individual second textile element 30a may be utilized to extend across all apertures, or a plurality of second textile elements 30a may be associated with each of the plurality of apertures. Similarly, an individual adhesive element 40a may be positioned around the plurality of apertures. Accordingly, the specific structure of article 10a may vary significantly within the scope of the present invention.

Article 10 and article 10a provide examples of structures produced through the method of the present invention. The following discussion will disclose the method in terms of the various components of article 10. One skilled in the relevant art will recognize that concepts disclosed with respect to the method may also be applied to article 10a or any other article requiring textile elements to be joined, such as articles 10b and 10c, which are disclosed below.

The method includes four general steps. As an initial step in the method, first textile element 20, second textile element 30, and adhesive element 40 are produced. A first bond is then formed between first textile element 20 and adhesive element 40 to define a bonded area and an unbonded area. Apertures 23 and 43 are then defined in first textile element 20 and adhesive element 40, respectively, by removing at least a portion of the bonded area. Finally, a second bond is formed between second textile element 30 and the bonded area, thereby joining first textile element 20 and second textile element 40. Each of the steps will be discussed in detail in the following material.

First Step—Producing the Elements

Figure 6:
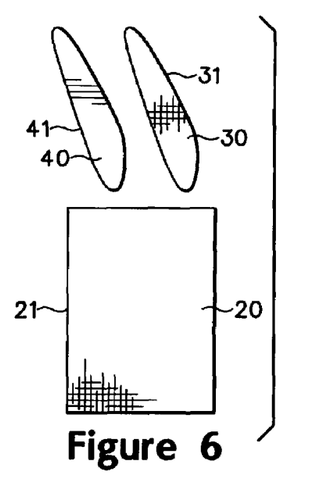
FIG. 6 is a plan view of a first textile element, a second textile element, and an adhesive element in accordance with a first step in the method.

The first step in the method is generally depicted in FIG. 6 and involves producing first textile element 20, second textile element 30, and adhesive element 40. In general, first textile element 20 is joined with other textile elements to form an article of apparel or other item of manufacture. Accordingly, first textile element 20 should be produced to have a shape and size consistent with the particular application for which article 10 is being manufactured. Similarly, the material from which first textile element 20 is produced should be appropriate for the particular application. As discussed above, the material may vary significantly within the scope of the present invention to include any textile. Alternately, first textile element 20 may have an undefined shape that may be cut to specific dimensions during other steps of the method or following completion of the method. Following the method, first textile element 20 includes aperture 23. During the first step, however, aperture 23 is absent such that first textile element 20 has a continuous configuration.

Second textile element 30 and adhesive element 40 are generally produced to have the same dimensions. Accordingly, second textile element 30 and adhesive element 40 may be produced simultaneously or separately from sheet materials through a die cutting operation, for example. The rationale behind producing second textile element 30 and adhesive element 40 to have the same dimensions relates to the final configuration of article 10, wherein, outer edge 31 and outer edge 41 coincide. If adhesive element 40 were larger than second textile element 30, adhesive element 40 would be visible to the individual and may present a non-aesthetic appearance to article 10. If adhesive element 40 were smaller than second textile element 30, the polymer material forming adhesive element 40 may not infiltrate the area adjacent to outer edge 31, thereby permitting unraveling or fraying of outer edge 31. With knowledge of the limitations discussed above, however, second textile element 30 and adhesive element 40 may be produced to have differing dimensions within the scope of the present invention.

The materials selected for second textile element 30 may vary to include any of the materials suitable for first textile element 20. In general, first textile element 20 and second textile element 30 are joined to provide a benefit relating to a combination of the different materials. For example, first textile element 20 and second textile element 30 may have different colors or textures to provide a specific aesthetic appearance, or first textile element 20 and second textile element 30 may be produced from different materials to enhance abrasion resistance in a specific portion of article 10. In addition, second textile element 30 may be produced from a mesh material that forms a vent in article 10. Accordingly, the material selected for second textile element 30 may vary significantly within the scope of the present invention to provide a different property to a portion of article 10.

The materials selected for adhesive element 40 may include any thermoplastic polymer, for example, as discussed above. A further consideration regarding adhesive element 40 relates to the manner in which adhesive element 40 is bonded with first textile element 20 in the second step, described hereafter. In general, heat and pressure are applied to form the bond. If adhesive element 40 were merely a thermoplastic polymer material, a portion of the polymer may bond with or otherwise engage the structure that applies the heat and pressure. In order to alleviate this possibility, a carrier sheet may be applied to one surface of adhesive element 40. The carrier sheet may be paper, a polymer having a higher melting temperature, or any other material that would effectively prevent molten portions of adhesive element 40 from engaging the structure that applies the heat and pressure.

Second Step—Forming the First Bond

Figure 7:
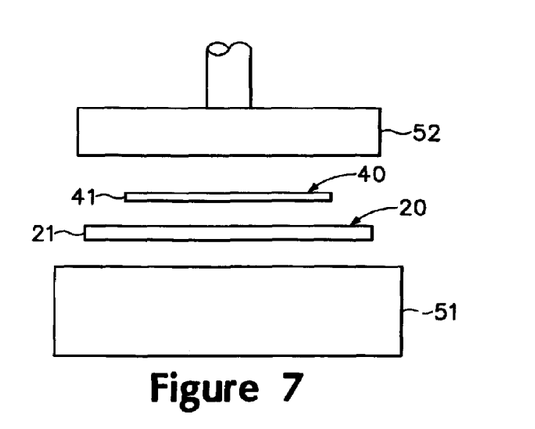
FIG. 7 is a side elevational view of the first textile element, adhesive element, and a bonding apparatus prior to a second step in the method.
Figure 8:
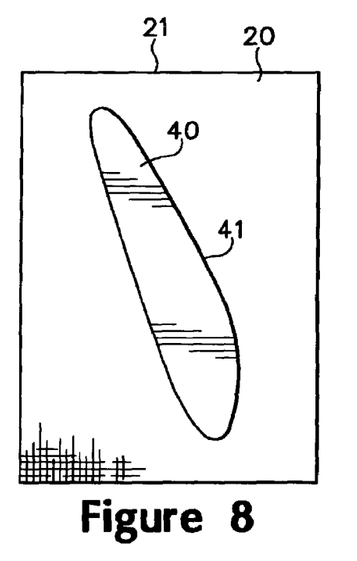
FIG. 8 is a plan view of the adhesive element bonded to the first textile element in accordance with the second step in the method.

The second step in the method is generally depicted in FIGS. 7 and 8 and involves forming a first bond between first textile element 20 and adhesive element 40. With reference to FIG. 7, first textile element 20 and adhesive element 40 are depicted as being positioned adjacent to each other and between a surface 51 and a platen 52 of a bonding apparatus. Surface 51 may be a stationary component of the bonding apparatus upon which first textile element 20 and adhesive element 40 are placed. Platen 52, which is heated to an appropriate temperature, then translates toward surface 51 and compresses first textile element 20 and adhesive element 40 against surface 51. The combination of the heat and pressure supplied by platen 52 elevates the temperature of adhesive element 40 and ensures contact between first textile element 20 and adhesive element 40, thereby causing a portion of adhesive element 40 to infiltrate the structure of first textile element 20. Upon subsequent cooling, a portion of adhesive element 40 solidifies around the individual fibers or filaments in first textile element 20, thereby forming the first bond. FIG. 8 depicts adhesive element 40 in a bonded relationship with first textile element 20 following the second step.

The bonding apparatus depicted in FIG. 7 is intended to provide one example of a structure suitable for forming the first bond. Alternately, surface 51 may be replaced by another heated platen, for example. Heat supplied through conduction is not the only method for forming the first bond. Radio frequency and ultrasonic bonding may also be utilized to form the first bond, which may require a substantially different type of bonding apparatus.

The degree of heat utilized to melt adhesive element 40 is primarily dependent upon the materials forming first textile element 20 and adhesive element 40. As an initial consideration, the degree of heat should not melt or otherwise damage first textile element 20 prior to the melting of adhesive element 40, unless such melting of first textile element 20 is intended for forming the first bond. This consideration aside, however, the degree of heat and pressure is generally related to the specific material forming adhesive element 40. For example, a temperature of 350° Fahrenheit and a pressure of 40 pounds per square inch that is applied for 15 seconds is generally sufficient to form the first bond when adhesive element 40 is a polyurethane material. Similarly, a temperature between 325 and 375° Fahrenheit and a pressure between 60 and 80 pounds per square inch that is applied for a time between 10 and 15 seconds is generally sufficient to form the first bond when adhesive element 40 is a vinyl or polyamide material.

Third Step—Defining the Aperture

Figure 9:
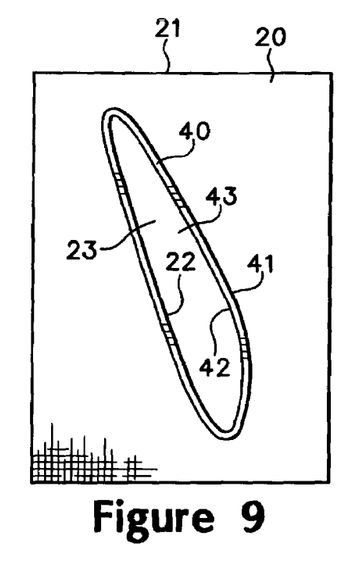
FIG. 9 is a plan view of the first textile element and the adhesive element in accordance with a third step in the method.

The third step in the method is generally depicted in FIG. 9 and involves defining apertures 23 and 43 through first textile element 20 and adhesive element 40, respectively. Apertures 23 and 43 have been discussed as separate apertures due to their formation through two separate elements. In effect, however, the step of defining apertures 23 and 43 provides a single aperture that extends through both first textile element 20 and adhesive element 40.

A die cutting operation or any other operation suitable for removing a portion of adhesive element 40 and a corresponding portion of first textile element 20 may be utilized to define apertures 23 and 43. In general, apertures 23 and 43 are defined in the portion of article 10 where adhesive element 40 is bonded to first textile element 20. During the second step, adhesive element 40 is bonded to first textile element 20, which defines a bonded area and an unbonded area. The bonded area is, therefore, the portion where first textile element 20 and adhesive element 40 are bonded, and the unbonded area is the portion of first textile element 20 that is not bonded to adhesive element 40. Accordingly, apertures 23 and 43 are defined through the bonded area.

The general purpose of adhesive element 40 is to join first textile element 20 and second textile element 30 around apertures 23 and 43. Accordingly, apertures 23 and 43 are defined in a manner that leaves a portion of adhesive element 40 extending entirely around aperture 23. The shape of apertures 23 and 43 may be proportioned to have the same shape as second textile element 30, but with lesser dimensions. This configuration ensures that apertures 23 and 43 fit entirely within the bonded area. The shape of apertures 23 and 43 may also be such that the remaining portion of adhesive element 40 has a uniform width between edges 41 and 42. Alternately, many apertures may be defined through first textile element 20 and adhesive element 40, as in article 10a.

Adhesive element 40 may include a carrier sheet, as discussed above. During the third step of the method, the carrier sheet may be removed in order to prepare adhesive element 40 for bonding with second textile element 30 in the fourth step of the method.

Fourth Step—Forming the Second Bond

Figure 10:
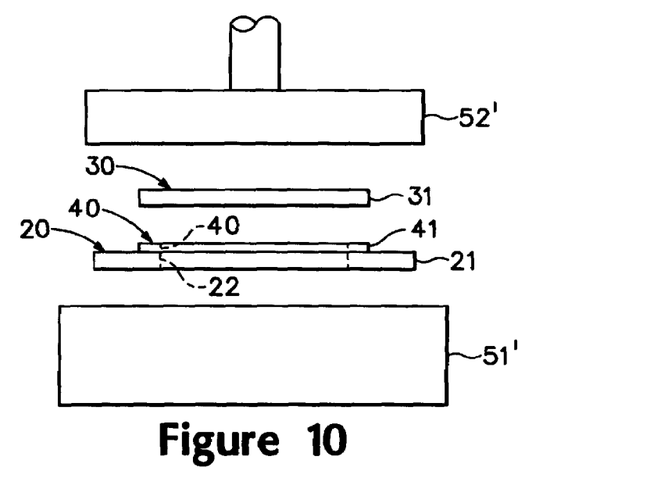
FIG. 10 is a side elevational view of the first textile element, second textile element, adhesive element, and a bonding apparatus prior to a fourth step in the method.

The fourth step in the method is generally depicted in FIG. 10 and involves forming a second bond between second textile element 30 and adhesive element 40. With reference to FIG. 10, first textile element 20, second textile element 30, and adhesive element 40 are depicted as being positioned adjacent to each other and between a surface 51' and a platen 52' of a bonding apparatus, which may be the same bonding apparatus utilized during the second step. Surface 51' may be a stationary component of the bonding apparatus. Platen 52', which is heated to an appropriate temperature, then translates toward surface 51' and compresses second textile element 30 and adhesive element 40. The combination of the heat and pressure supplied by platen 52' elevates the temperature of adhesive element 40 and ensures contact between second textile element 30 and adhesive element 40, thereby causing a portion of adhesive element 40 to infiltrate the structure of second textile element 30. Upon subsequent cooling, a portion of adhesive element 40 solidifies around the individual fibers or filaments in second textile element 30, thereby forming the first bond. FIGS. 1–4 depict first textile element 20, second textile element 30, and adhesive element 40 following the second step.

The melting temperature of adhesive element 40 is generally the same in the fourth step as during the second step. The same temperature and pressure may, therefore, be applied to form the second bond. Depending upon the speed with which the third step is performed, residual heat may remain within adhesive element 40 prior to the application of heat and pressure in the fourth step. Accordingly, the time period for the application of the heat and pressure may be shortened to account for the residual heat.

Further Textile Joining Configurations

Figure 11:
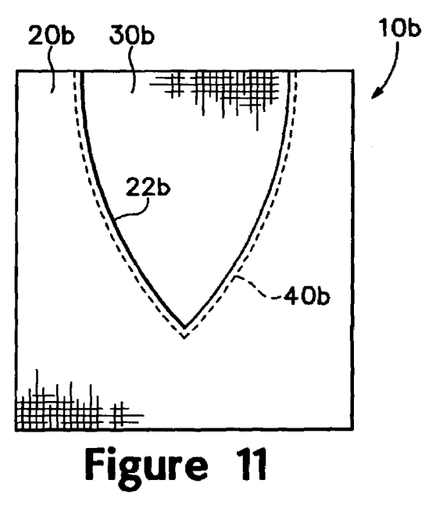
FIG. 11 is a plan view of another article formed in accordance with the method of the present invention.

With respect to article 10, aperture 23 and aperture 43 are formed on interior portions of first textile element 20 and adhesive element 40, respectively. That is, apertures 23 and 43 are spaced inward from the outer edges of elements 20 and 40. The general method disclosed above, however, may be applied to configurations wherein apertures are formed in edge portions of one or more of the elements. For example, FIG. 11 depicts an article 10b that includes a first textile element 20b, a second textile element 30b, and an adhesive element 40b. In forming article 10b, adhesive element 40b is bonded to first textile element 20b and an aperture, which corresponds with aperture edge 22b, is defined on an edge portion of both first textile element 20b and adhesive element 40b, rather than through interior portions. In other words, the apertures in first textile element 20b and adhesive element 40b are not spaced from all outer edges of the elements. Adhesive element 40b is then utilized to join first textile element 20b with second textile element 30b. In this configuration, therefore, textile element 40b extends into an interior portion of article 10b and shares a common outer edge with first textile element 20b.

Figure 12:
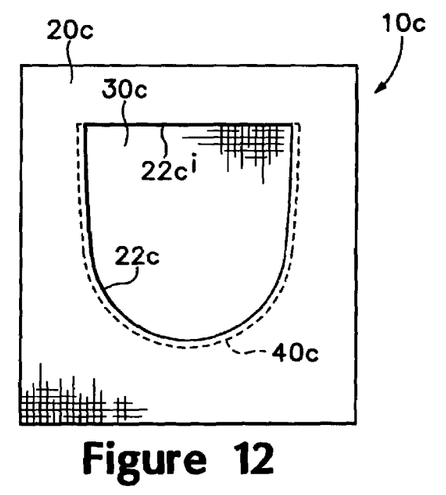
FIG. 12 is a plan view of yet another article formed in accordance with the method of the present invention.

Referring to FIG. 12 an article 10c having a first textile element 20c, a second textile element 30c, and an adhesive element 40c is depicted. An aperture corresponding with aperture edges 22c and 22c' is defined through both first textile element 20c and adhesive element 40c. Whereas the aperture extends through an interior portion of first textile element 20c, the aperture is positioned on an edge portion of adhesive element 40c. Accordingly, adhesive element 40 only extends partially around the aperture formed through first textile element 20c and does not extend along the portion of the aperture defined by aperture edge 22c'. In this configuration, adhesive element 40c joins first textile element 20c with second textile element 30c, but a portion of the edge of second textile element 30c remains unbonded to first textile element 20c. That is, second textile element 20c remains unbonded along aperture edge 22c'. This configuration may be utilized, for example, to provide a pocket or access opening through article 10c.

CONCLUSION

The general method described above may be applied to a wide range of products to join various textile elements. An article formed through the method has advantages over articles formed through conventional sewing techniques. For example, the article may include textile elements with any practical shape, whether the shape includes angles, small-radius curves, or other complex features. From an aesthetic perspective, the ability to join elements with any practical shape provides the capacity to incorporate a functional graphic into the article. As discussed with respect to article 10a, a mesh material may be integrated into the article that serves to ventilate the article and provide a specific aesthetic to the article. In addition, edges of the elements do not need to be surged, hemmed, or turned to prevent unraveling or fraying. Furthermore, the seams generally have a thickness of two textile layers, rather than the three or more produced through conventional sewing techniques.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

That which is claimed is:

1. A method of joining a first textile element and a second textile element, the method comprising steps of:
    shaping the first textile element to have greater area than the second textile element and an adhesive element;
    forming a first bond between the first textile element and the adhesive element by heating the adhesive element and the first textile element to define a bonded area and an unbonded area, the first bond being located in a spaced relationship with at least some of outer edges of the first textile element;
    defining an aperture in the first textile element and the adhesive element by removing at least a portion of the bonded area; and
    forming a second bond between the second textile element and the bonded area, thereby joining the first textile element and the second textile element.

2. The method of claim 1, wherein the step of forming the first bond includes applying pressure to the adhesive element and the first textile element.

3. The method of claim 1, wherein the step of forming the first bond includes applying pressure with a platen of a heated press.

4. The method of claim 1, wherein the step of forming the first bond includes locating the first bond in a spaced relationship with all outer edges of the first textile element.

5. The method of claim 1, wherein the step of defining the aperture includes locating the aperture entirely within the bonded area.

6. The method of claim 1, wherein the step of defining the aperture includes locating the aperture at least partially within the bonded area.

7. The method of claim 1, wherein the step of defining the aperture includes dimensioning the aperture to have proportions that are substantially similar to proportions of the adhesive element.

8. The method of claim 1, wherein the step of defining the aperture includes locating the aperture to form a thin border of the bonded area around the entire aperture.

9. The method of claim 1, wherein the step of defining the aperture includes locating the aperture to form a thin border of the bonded area around at least a portion of the aperture.

10. The method of claim 1, wherein the step of defining the aperture includes die cutting the aperture.

11. The method of claim 1, wherein the step of forming the second bond includes locating the second textile element in a spaced relationship with at least some outer edges of the first textile element.

12. The method of claim 1, wherein the step of forming the second bond includes heating the adhesive element and the second textile element.

13. The method of claim 12, wherein the step of forming the second bond includes applying pressure to the adhesive element and the second textile element.

14. The method of claim 12, wherein the step of forming the second bond includes applying pressure with a platen of a heated press.

15. The method of claim 1, further including a step of shaping the second textile element and the adhesive element to have substantially similar dimensions.

16. The method of claim 1, further including a step of selecting the adhesive element to include a thermoplastic polymer material.

17. A method of joining a first textile element and a second textile element, the method comprising steps of:
    shaping the second textile element and a thermoplastic adhesive element to have substantially similar dimensions, and shaping the first textile element to have greater area than the second textile element and the adhesive element;
    forming a first bond between the first textile element and the adhesive element through the application of heat and pressure to define a bonded area and an unbonded area, the bonded area being located in a spaced relationship with at least some outer edges of the first textile element;
    defining an aperture in the first textile element and the adhesive element by removing at least a portion of the bonded area, the aperture being located substantially within the bonded area; and
    forming a second bond between the second textile element and the bonded area through the application of heat and pressure, thereby joining the first textile element and the second textile element.

18. The method of claim 17, wherein the step of shaping includes selecting the adhesive element to include one of a group consisting of polyamide, polyester, polyolefin, and vinyl.

19. The method of claim 17, wherein the step of shaping includes selecting the adhesive element to include a polyurethane material.

20. The method of claim 17, wherein the step of forming the first bond includes locating the bonded area in a spaced relationship with all outer edges of the first textile element.

21. The method of claim 17, wherein the step of defining the aperture includes dimensioning the aperture to have proportions that are substantially similar to proportions of the adhesive element.

22. The method of claim 17, wherein the step of defining the aperture includes die cutting the aperture.

23. The method of claim 17, wherein the step of defining the aperture includes locating the aperture entirely within the outer edges of the first textile element.

24. A method of joining a first textile element and a second textile element, the method comprising steps of:
    shaping the second textile element and a thermoplastic polyurethane adhesive element to have substantially similar dimensions, and shaping the first textile element to have greater area than the second textile element and the adhesive element;
    forming a first bond between the first textile element and the adhesive element through the application of heat and pressure to define a bonded area and an unbonded area, the bonded area being located in a spaced relationship with outer edges of the first textile element;
    defining an aperture in the first textile element and the adhesive element by removing at least a portion of the bonded area, the aperture being located entirely within the bonded area, and the aperture having proportions that are substantially similar to proportions of the adhesive element;
    forming a second bond between the second textile element and the bonded area through the application of heat and pressure, thereby joining the first textile element and the second textile element; and
    incorporating the first textile element, second textile element, and adhesive element into an article of apparel.

25. The method of claim 24, wherein the step of forming the first bond includes applying the heat and the pressure with a platen of a press.

26. The method of claim 24, wherein the step of defining the aperture includes die cutting the aperture.

27. The method of claim 24, wherein the step of forming the second bond includes applying the heat and the pressure with a platen of a press.

28. A method of joining a first textile element and a second textile element, the method comprising steps of:
    shaping the second textile element and a thermoplastic adhesive element to have substantially similar dimensions, and shaping the first textile element to have greater area than the second textile element and the adhesive element;
    forming a first bond between the first textile element and the adhesive element through the application of heat and pressure with a platen of a press to define a bonded area and an unbonded area, the bonded area being located in a spaced relationship with at least some outer edges of the first textile element;
    defining an aperture in the first textile element and the adhesive element by removing at least a portion of the bonded area, the aperture being located substantially within the bonded area; and forming a second bond between the second textile element and the bonded area through the application of heat and pressure, thereby joining the first textile element and the second textile element.

29. A method of joining a first textile element and a second textile element, the method comprising steps of:

shaping the second textile element and a thermoplastic adhesive element to have substantially similar dimensions, and shaping the first textile element to have greater area than the second textile element and the adhesive element;

forming a first bond between the first textile element and the adhesive element through the application of heat and pressure with a platen of a press to define a bonded area and an unbonded area, the bonded area being located in a spaced relationship with all outer edges of the first textile element;

defining an aperture in the first textile element and the adhesive element by removing at least a portion of the bonded area, the aperture being located substantially within the bonded area; and forming a second bond between the second textile element and the bonded area through the application of heat and pressure, thereby joining the first textile element and the second textile element.

* * * * *